(12) United States Patent
Yu et al.

(10) Patent No.: US 8,452,089 B2
(45) Date of Patent: May 28, 2013

(54) SYSTEM AND METHOD FOR EFFECTIVELY PERFORMING AN IMAGE IDENTIFICATION PROCEDURE

(75) Inventors: Liangyin Yu, Fremont, CA (US); Ming-Chang Liu, San Jose, CA (US)

(73) Assignee: Sony Corporation, Tokyo (JP)

(*) Notice: Subject to any disclaimer, the term of this patent is extended or adjusted under 35 U.S.C. 154(b) by 158 days.

(21) Appl. No.: 13/065,874

(22) Filed: Mar. 31, 2011

(65) Prior Publication Data
US 2012/0250987 A1    Oct. 4, 2012

(51) Int. Cl.
*G06K 9/34* (2006.01)

(52) U.S. Cl.
USPC .................................................. 382/165

(58) Field of Classification Search
USPC ............ 382/100, 101, 103, 105, 112–113, 382/159, 162, 164–165, 168, 170–171, 173–181, 190, 209, 218–222, 224, 229, 282, 382/291–292, 294, 305–306; 348/87, 91–92, 348/125–130, 161; 358/403, 462; 707/728, 707/999.005, 999.006; 715/210, 788
See application file for complete search history.

(56) References Cited

U.S. PATENT DOCUMENTS

| | | | |
|---|---|---|---|
| 7,327,887 B2 * | 2/2008 | Wenzel | 382/209 |
| 7,620,248 B2 * | 11/2009 | Reissman | 382/218 |
| 7,953,299 B2 * | 5/2011 | Shiiyama | 382/305 |
| 8,156,116 B2 * | 4/2012 | Graham et al. | 707/728 |
| 8,184,155 B2 * | 5/2012 | Ke et al. | 348/142 |
| 8,276,088 B2 * | 9/2012 | Ke et al. | 715/768 |

FOREIGN PATENT DOCUMENTS

JP    2000082069 A    3/2000

OTHER PUBLICATIONS

Jonathan J. Hull, Document Image Matching and Retrieval With Multiple Distortion-Invariant Descriptors, Ricoh California Research Center, Menlo Park, CA, http://rii.ricoh.com/~hull/pubs/hull_das94.pdf, 1995, p. 379-396.
Yan Wang, Kebin Jia, A Novel Information Entropy Shift Based Image Retrieval Algorithm, IIH-MSP, Proceedings of the 2008 International Conference on Intelligent Information Hiding and Multimedia Signal Processing, http://portal.acm.org/citation.cfm? id=1448598, 2008, p. 1.

* cited by examiner

*Primary Examiner* — Jose Couso
(74) *Attorney, Agent, or Firm* — Gregory J. Koerner; Redwood Patent Law (57) ABSTRACT

A system and method for effectively performing an image identification procedure includes an image matching manager that derives source characteristics for a source image and target characteristics for target images. The image matching manager compares the source characteristics and the target characteristics to determine whether the source image matches any of the target images. The source characteristics and the target characteristics may include color-space characteristics and curve-space characteristics from the respective images. A processor of an electronic device typically controls the image matching manager to effectively perform the image identification procedure.

20 Claims, 6 Drawing Sheets

SYSTEM AND METHOD FOR EFFECTIVELY PERFORMING AN IMAGE IDENTIFICATION PROCEDURE

BACKGROUND SECTION

1. Field of the Invention

This invention relates generally to techniques for managing image information, and relates more particularly to a system and method for effectively performing an image identification procedure.

2. Description of the Background Art

Implementing effective methods for managing image information is a significant consideration for designers and manufacturers of electronic systems. However, effectively implementing these electronic systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports image identification procedures may benefit from an efficient implementation because of the large amount and complexity of the digital data involved.

Due to growing demands on system resources and substantially increasing data magnitudes, it is apparent that developing new techniques for managing image information is a matter of concern for related electronic technologies. Therefore, for all the foregoing reasons, developing effective systems for managing image information remains a significant consideration for designers, manufacturers, and users of contemporary electronic systems.

SUMMARY

In accordance with the present invention, a system and method are disclosed for effectively performing an image identification procedure. In accordance with one embodiment of the present invention, an image matching (IM) manager or other appropriate entity initially selects a source image. The IM manager then performs a down sampling process upon the source image to produce a down-sampled image that typically has a lower-resolution and fewer pixels than the original source image. The IM manager performs a spectral filtering process upon the down-sampled image to produce a filtered image. In certain embodiments, the spectral filtering includes a band-pass filtering process that eliminates the highest and lowest frequencies from down-sampled image.

The IM manager next performs a segmentation procedure upon the filtered image to produce a segmented image that includes two or more dominant regions/segments that are separated by corresponding respective boundaries that represent the source image's characteristic curves. The IM manager then performs separate matching procedures to characterize and define the source image in both color space and curve space. In particular, the IM manager performs a color-space matching procedure upon the dominant regions defined in the segmented image by utilizing any effective techniques.

For example, the IM manager may define two color regions in a color matching image that are separated by the characteristic curve defined in the segmented image. In certain embodiments, the IM manager derives these representative colors from pixels within a predefined distance of the characteristic curve. The IM manager may then utilize any effective techniques to compute a color difference value to represent the source image in color space. The IM manager then performs the color-space matching procedure by comparing the color difference value with corresponding color difference values of various target images.

The IM manager may similarly perform a curve-space matching procedure to compare a characteristic curve of the source image with corresponding characteristic curves of target images. The present invention may perform effective curve matching procedures by utilizing any effective and appropriate techniques. In certain embodiments, the IM manager may implement curve-space matching by utilizing appropriate standard or enhanced level set methodologies. In certain embodiments, the IM manager utilizes the cumulated difference of curvature as a cost function. The IM manager may utilize appropriate level set methods to solve cost-minimization partial differential equations (PDEs). The minimum cost may then serve as a measure of curve differences between characteristic curves of the source image and selected target images.

The IM manager may thus integrate the results of the color-space matching procedure and the curve-space matching procedure to effectively identify any matching target images. The present invention therefore provides an improved a system and method for effectively performing an image identification procedure

DETAILED DESCRIPTION

The present invention relates to an improvement in image identification systems. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for effectively performing an image identification procedure, and may include an image matching manager that derives source characteristics for a source image and target characteristics for target images. The image matching manager compares the source characteristics and the target characteristics to determine whether the source image matches any of the target images. The source characteristics and the target characteristics may include color-space characteristics and curve-space characteristics from the respective images. A processor of an electronic device typically controls the image matching manager to effectively perform the image identification procedure.

Figure 1:
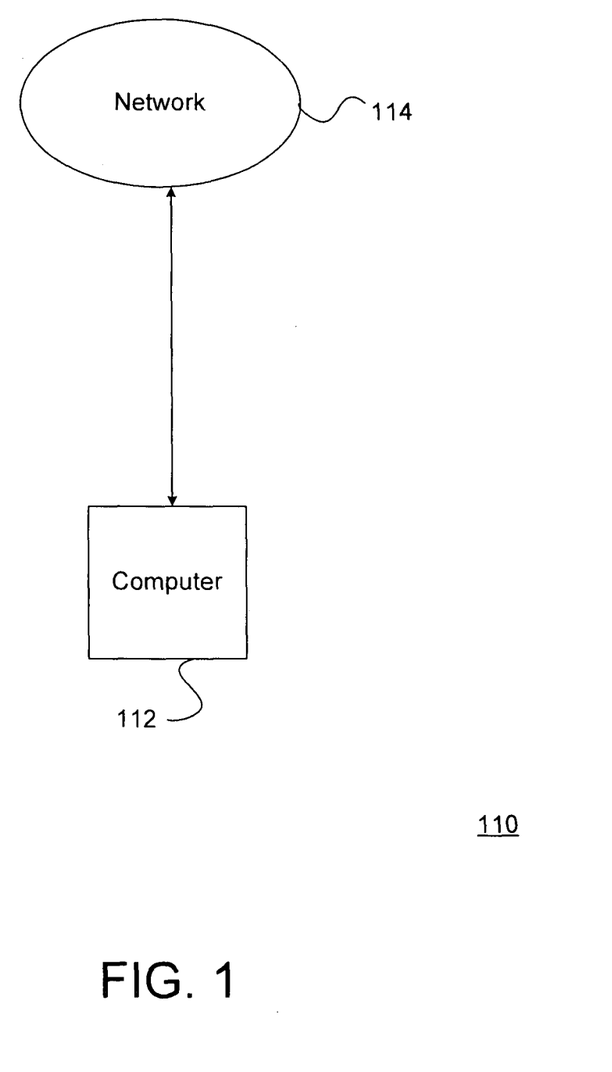
FIG. 1 is a block diagram of an electronic system, in accordance with one embodiment of the present invention.

Referring now to FIG. 1, a block diagram of an electronic system 110 is shown, in accordance with one embodiment of the present invention. In the FIG. 1 embodiment, electronic system 110 may include, but is not limited to, a computer 112 and a network 114. In alternate embodiments, electronic system 110 may be implemented using various components and configurations in addition to, or instead of, those discussed in conjunction with the FIG. 1 embodiment. For example, system 110 may readily include any number of other electronic devices in addition to computer 112.

In the FIG. 1 embodiment, computer 112 may be implemented as any electronic device that is configured to support and manage various functionalities in electronic system 110. In the FIG. 1 embodiment, network 114 may include any appropriate entities or devices that communicate with computer 112 via wireless or wired communication techniques. In the FIG. 1 embodiment, computer 112 may perform an image identification procedure to find one or more target images that match a source image.

In accordance with the present invention, a matching algorithm is advantageously designed to accurately identify target images that may be under various kinds of image modification including standard rotation and scaling, as well as non-standard modifications such as scaling, noise contamination and color modification. The algorithm for image matching is designed to identify target images derived from the same source image. The matching algorithm is designed to be able to identify modifications such as cropping, rotating, scaling, noise contamination, and some color modification.

According to the present invention, a novel image content decomposition method is developed with subsequent segmentation, so that a set of characteristic curves are identified. This procedure is followed by color and curve matching algorithms around the characteristic curves to uniquely identify target images subject any of the above-mentioned modifications. The present invention may be effectively utilized to identify images or documents of similar layout, or to identify copyrighted material. The present invention may also be effectively utilized to identify duplicated target images from a large image database, or to group images according to their particular contents. Furthermore, the invention may be utilized to find photos taken of the same locations or subjects.

The present invention therefore provides an effective algorithm that is based on image decomposition and segmentation. Specific matching modules are provided for the decomposition process. Optimization methods may be implemented using level set techniques through partial differential equations. Server models may be utilized to allow a large number of images to be characterized in a database for online matching. The implementation and utilization of the FIG. 1 electronic system 110 is further discussed below in conjunction with FIGS. 2-6.

Figure 2:
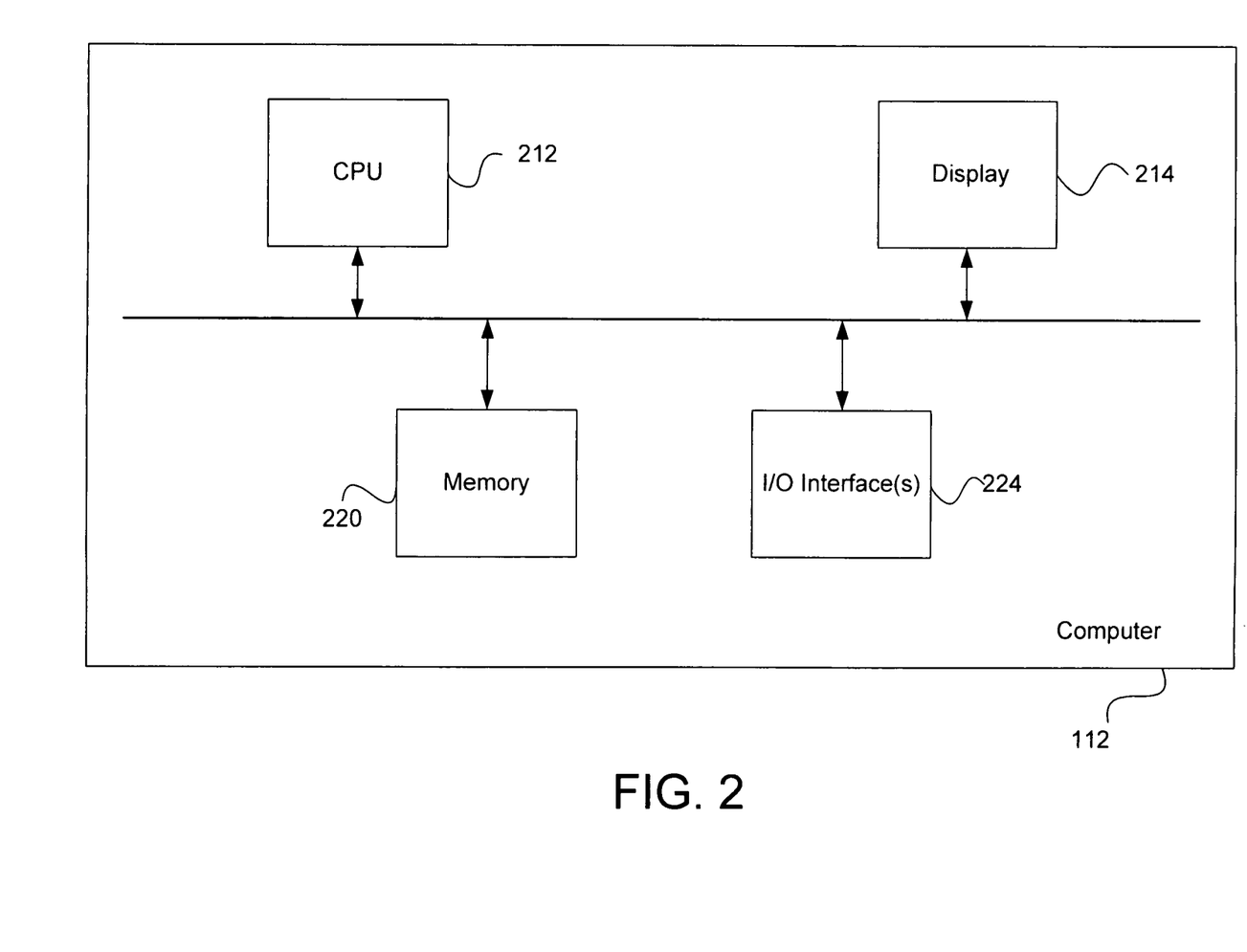
FIG. 2 is a block diagram for one embodiment of the computer of FIG. 1, in accordance with the present invention.

Referring now to FIG. 2, a block diagram for one embodiment of the FIG. 1 computer 112 is shown, in accordance with the present invention. In the FIG. 2 embodiment, computer 112 may include, but is not limited to, a central processing unit (CPU) 212, a display 214, a memory 220, and one or more input/output interfaces (I/O interfaces) 224. In alternate embodiments, computer 112 may be implemented using various components and configurations in addition to, or instead of, those certain of those components and configurations discussed in conjunction with the FIG. 2 embodiment. In addition, computer 112 may alternately be implemented as any other desired type of electronic device or entity.

In the FIG. 2 embodiment, CPU 212 may be implemented to include any appropriate and compatible microprocessor device that preferably executes software instructions to thereby control and manage the operation of computer 112. The FIG. 2 display 214 may include any effective type of display technology including a cathode-ray-tube monitor or a liquid-crystal display device with an appropriate screen for displaying various information to a device user.

In the FIG. 2 embodiment, memory 220 may be implemented to include any combination of desired storage devices, including, but not limited to, read-only memory (ROM), random-access memory (RAM), and various types of non-volatile memory, such as floppy disks or hard disks. The contents and functionality of memory 220 are further discussed below in conjunction with FIG. 3.

In the FIG. 2 embodiment, I/O interfaces 224 may preferably include one or more input and/or output interfaces to receive and/or transmit any required types of information for computer 112. For example, in the FIG. 2 embodiment, computer 112 may utilize I/O interfaces 224 to communicate with network 114 (see FIG. 1). In addition, a system user may utilize I/O interfaces 224 to communicate with computer 112 by utilizing any appropriate and effective techniques.

In the FIG. 2 embodiment, computer 112 may effectively perform searches for identifying duplicate target images, even if the target images not exact duplications of an original source image. For example, the target images may result from modifications of the source image. Such modification may include, but are not limited to, color modifications, cropping, rotation, scaling, blurring, translation (moving reference points), special effects, etc.

In the FIG. 2 embodiment, computer 112 may search a target image database for matching target images that correspond to the original source image. In certain embodiments, computer 112 or other appropriate entity may process the target images in advance to create corresponding image signatures that uniquely representing the respective target images. A search may then be easily performed by searching the target image set for signatures that match the source image signature. The implementation and utilization of the FIG. 2 computer 112 is further discussed below in conjunction with FIGS. 3-6.

Figure 3:
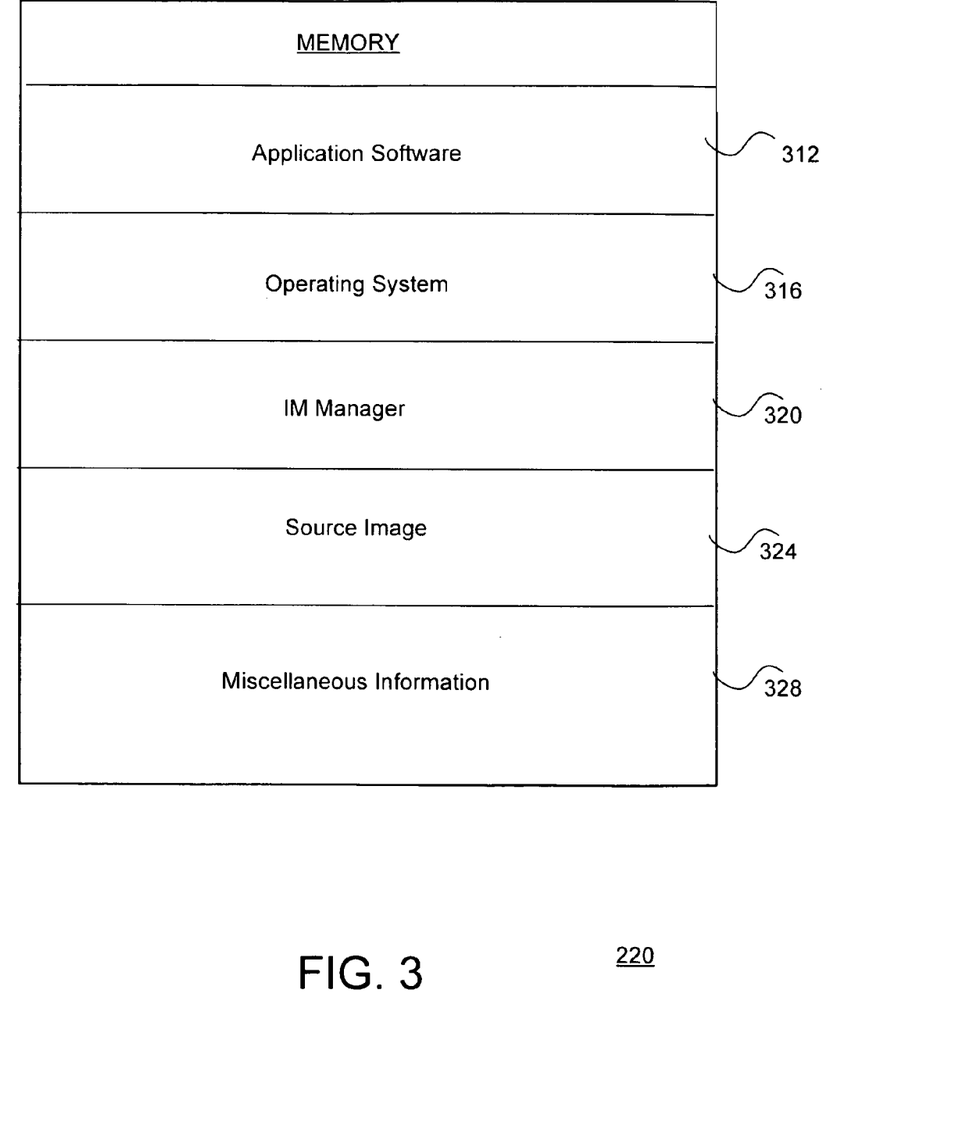
FIG. 3 is a block diagram for one embodiment of the memory of FIG. 2, in accordance with the present invention.

Referring now to FIG. 3, a block diagram for one embodiment of the FIG. 2 memory 220 is shown, in accordance with the present invention. In the FIG. 3 embodiment, memory 220 includes, but is not limited to, application software 312, an operating system 316, an image matching (IM) manager 320, a source image 324, and miscellaneous information 328. In alternate embodiments, memory 220 may include various other components and functionalities in addition to, or instead of, certain those components and functionalities discussed in conjunction with the FIG. 3 embodiment.

In the FIG. 3 embodiment, application software 312 may include program instructions that are preferably executed by CPU 212 (FIG. 2) to perform various functions and operations for computer 112. The particular nature and functionality of application software 312 preferably varies depending upon factors such as the specific type and particular functionality of the corresponding computer 112.

In the FIG. 3 embodiment, operating system 316 preferably controls and coordinates low-level functionality of computer 112. In the FIG. 3 embodiment, image matching (IM) manager 320 may effectively perform various image identification procedures to accurately match source image 324 with various appropriate target images in accordance with the present invention. In the FIG. 3 embodiment, miscellaneous information 328 may include any temporary or permanent information or data required by computer 112 or IM manager 320.

In the FIG. 3 embodiment, IM manager 320 performs a given image identification procedure by initially obtaining a source image 324. IM manager 320 then performs a content decomposition process on the source image 324 to identify one or more characteristic curves. Next, IM manager 320 performs separate matching algorithms (high and low frequency) on the source image 324, and then integrates the matching results.

In the content decomposition process, IM manager 320 decomposes the source image 324 into high and low spectral components. In certain embodiments, the highest frequencies and lowest frequencies are ignored, and the remaining frequencies are used for matching algorithms. IM manager 320 may then compute boundaries (characteristic curves) between dominant regions by segmentation. In certain embodiments, the dominant regions may be defined by prominent characteristics such as size, texture, contrast, and color.

In the FIG. 3 embodiment, IM manager 320 separately performs the individual matching algorithms in both color space (low spectral) and in gradient space (high spectral). In certain embodiments, the low-spectral color-space matching may be performed in accordance with a standard or enhanced CIEDE 2000 model. In certain embodiments, the low-frequency color-matching algorithm may be applied only to a narrow band of pixels surrounding the characteristic curve. Similarly, IM manager 320 may perform the high-spectral matching in curve space by utilizing any effective techniques. Further details regarding certain embodiments for performing high-spectral matching in curve space are discussed below in conjunction with FIGS. 5-6.

In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein. The implementation and utilization of IM manager 320 are further discussed below in conjunction with FIGS. 4 through 6.

Figure 4:
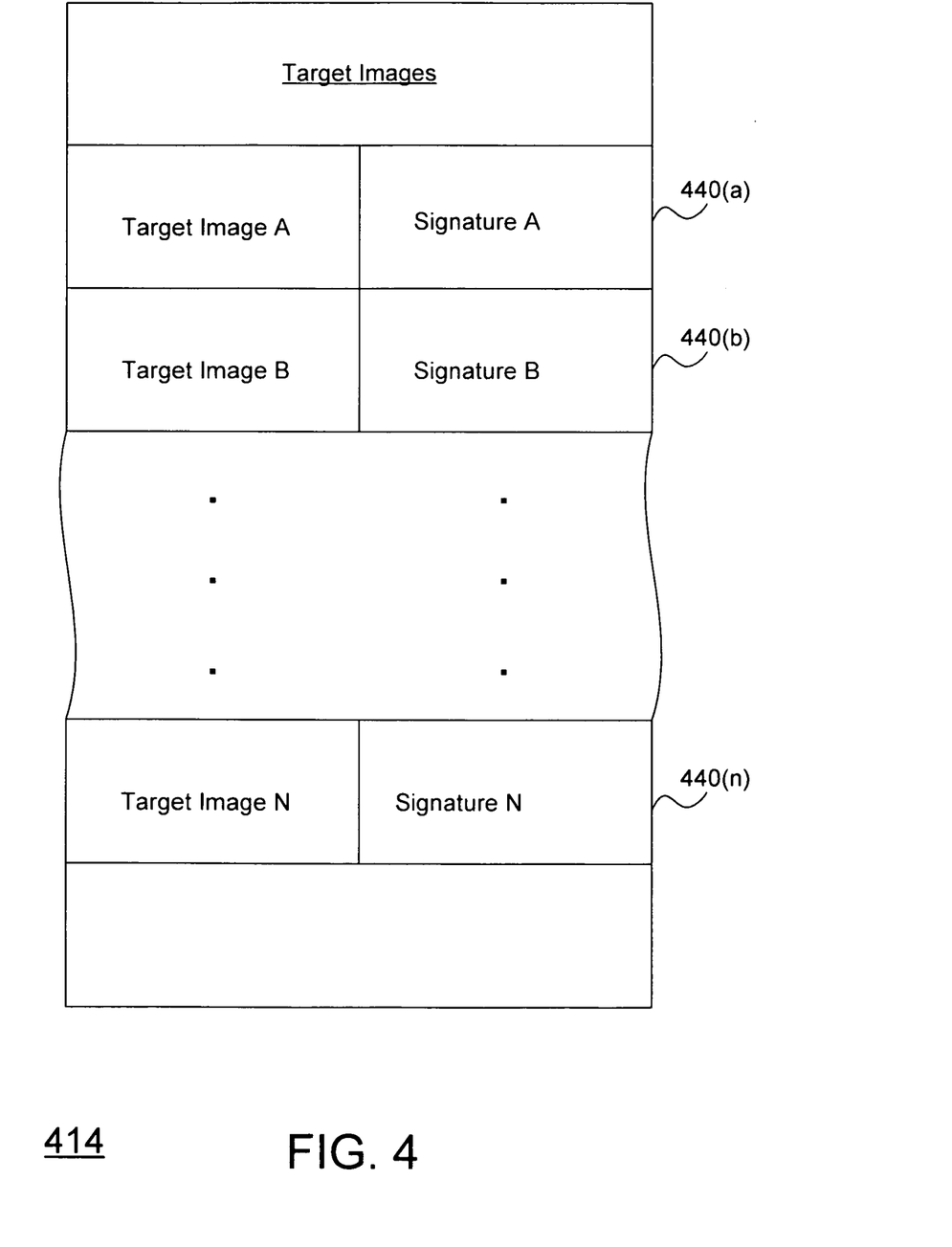
FIG. 4 is a block diagram of target images, in accordance with one embodiment of the present invention.

Referring now to FIG. 4, a block diagram of a set of target images 414 is shown, in accordance with one embodiment of the present invention. In alternate embodiments, target images 414 may be implemented using various components and configurations in addition to, or instead of, certain of those components and configurations discussed in conjunction with the FIG. 4 embodiment.

In the FIG. 4 embodiment, the set of target images 414 includes a series of individual target images and 440 and corresponding signatures. In accordance with the present invention, computer 112 (FIG. 2) or other appropriate entity may search target images 440 for matching target images that correspond to an original source image. In certain embodiments, computer 112 or other appropriate entity may process the target images 440 in advance to create corresponding image signatures that uniquely representing the respective target images 440. A search may then be easily performed by searching the target image set 414 for signatures that match a source image signature.

In accordance with various embodiment's of the present invention, target image set 414 may be implemented and stored in any appropriate location(s). For example, target images 414 may reside on computer 112, or alternately, may reside on one or more computers, databases, or other locations in network 114 (FIG. 1). Additional details for effectively performing an image identification procedure are further discussed below in conjunction with FIGS. 5-6.

Figure 5:
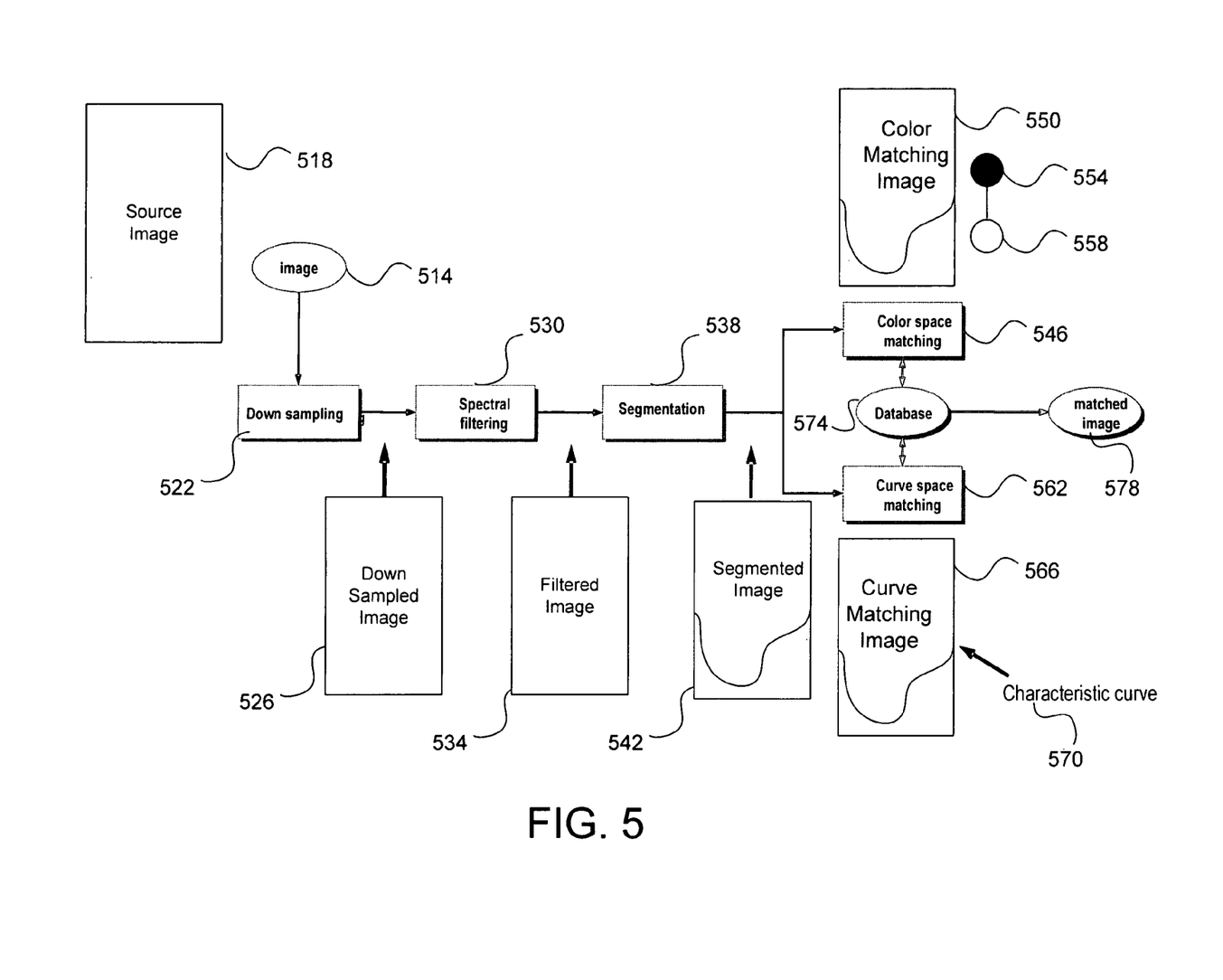
FIG. 5 is a diagram illustrating an image identification procedure, in accordance with one embodiment of the present invention.

Referring now to FIG. 5, a diagram illustrating an image identification procedure is shown, in accordance with one embodiment of the present invention. The FIG. 5 embodiment is presented for purposes of illustration, and in alternate embodiments, image identification procedures may be performed using various steps and functionalities in addition to, or instead of, certain of those steps and functionalities discussed in conjunction with the FIG. 5 embodiment.

In step 514 of the FIG. 5 embodiment, an IM manager 320 or other appropriate entity initially selects a source image 518. In step 522, the IM manager 320 then performs a down sampling process upon the source image 518 to produce a down-sampled image 526 that typically has a lower-resolution and fewer pixels than the original source image 518. In step 530, the IM manager 320 performs a spectral filtering process upon the down-sampled image 526 to produce a filtered image 534. In certain embodiments, the spectral filtering includes a band-pass filtering process that eliminates the highest and lowest frequencies from down-sampled image 526.

In step 538, the IM manager 320 performs a segmentation procedure upon the filtered image 534 to produce a segmented image 542 that includes two or more dominant regions/segments that are separated by corresponding respective boundaries that represent the source image's characteristic curves. In the FIG. 5 process, the IM manager 320 then performs separate matching procedures to represent and define source image 518 in both color space and curve space.

In step 546, the IM manager 320 performs a color-space matching procedure 546 upon the dominant regions defined in segmented image 542 by utilizing any effective techniques. For example, in the FIG. 5 embodiment, the IM manager 320 defines two color regions in color matching image 550 that are separated by the characteristic curve 570 defined in segmented image 542. In the FIG. 5 embodiment, the two color regions may be represented by a first representative color 554 and a second representative color 558.

In certain embodiments, IM manager 320 derives these representative colors only from pixels within a predefined distance of the characteristic curve 570. For example, in the FIG. 5 example, representative color 554 is from a color band that is adjacent to and above the characteristic curve 570, and representative color 558 is from a color band that is adjacent to and below the characteristic curve 570. In the FIG. 5 embodiment, IM manager 320 may then utilize any effective techniques to compute a color difference value to represent source image 518 in color space.

For example, IM manager 320 may utilize standard or enhanced CIEDE 2000 techniques to effectively compute the color difference value In the FIG. 5 embodiment, IM manager 320 may then perform the color-space matching procedure by comparing the color difference value of source image 518 with corresponding color difference values of various selected target images in database 574.

In the FIG. 5 embodiment, the IM manager 320 may similarly perform a curve-space matching procedure 562 to compare the characteristic curve 570 of curve matching image 566 with characteristic curves of target images in database 574. In the FIG. 5 embodiment, the IM manager 320 may then integrate the results of the color-space matching procedure 546 and the curve-space matching procedure 562 for use in identifying any matching target images 578 in database 574.

The present invention thus provides an improved system and methodology for effectively performing an image identification procedure. Additional details and techniques for performing the foregoing curve-space matching procedure 562 are further discussed below in conjunction with FIG. 6.

Figure 6:
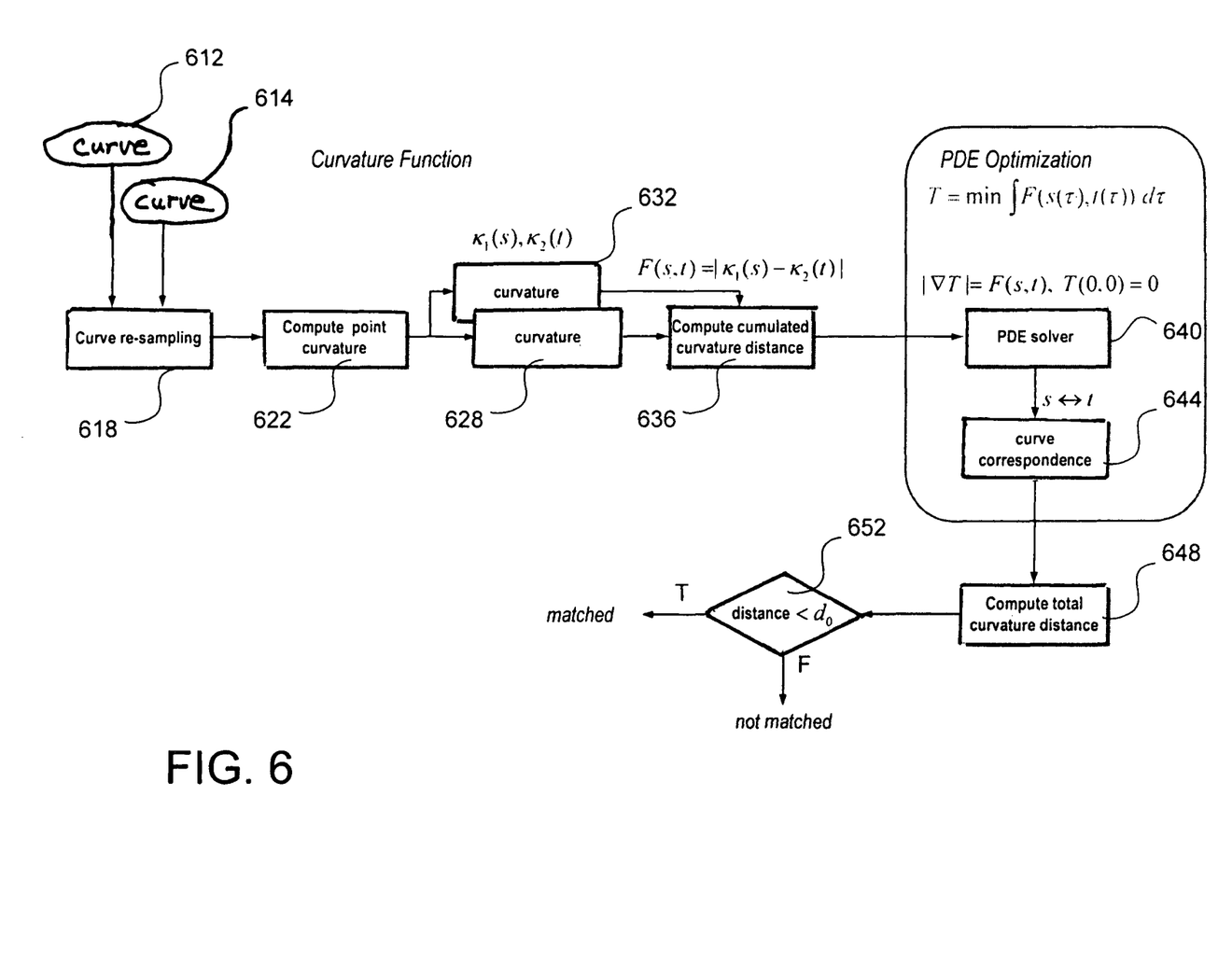
FIG. 6 is a diagram illustrating curve matching procedure, in accordance with one embodiment of the present invention.

Referring now to FIG. 6, a diagram illustrating a curve matching procedure is shown, in accordance with one embodiment of the present invention. The FIG. 6 embodiment is presented for purposes of illustration, and in alternate embodiments, curve matching procedures may be performed using various steps and functionalities in addition to, or instead of, certain of those steps and functionalities discussed in conjunction with the FIG. 6 embodiment. In certain embodiments, the FIG. 6 procedure may correspond to step 562 of FIG. 5.

The present invention may perform effective curve matching procedures by utilizing any effective and appropriate techniques. In certain embodiments, IM manager 320 (FIG. 3) may implement curve-space matching by utilizing appropriate standard or enhanced level set methodologies. In the FIG. 6 embodiment, IM manager 320 utilizes the cumulated difference of curvature as a cost function. IM manager 320 may utilize appropriate level set methods to solve cost-minimization partial differential equations (PDEs). The minimum cost may then serve as a measure of curve differences between characteristic curves of the source image 518 (FIG. 5) and a selected target image 440 (FIG. 4).

In the FIG. 6 embodiment, IM manager 320 or other appropriate entity initially selects a characteristic source curve 612 from the source image 518 and a corresponding characteristic target curve 614 from a selected target image 440. In the FIG. 6 embodiment, characteristic curves 612 and 614 may be expressed according to the following formulas:

$$C_1(x(s),y(s)), C_2(x(t),y(t))$$

where x(s) are x coordinates of the source curve 612, and y(s) are y coordinates of the source curve 612, x(t) are x coordinates of the target curve 614, and y(t) are y coordinates of the target curve 614.

In step 618, IM manager 320 performs a curve re-sampling procedure on characteristic curves 612 and 614 to normalize the curves (remove noise, transients, etc.). The curve re-sampling procedure thus produces corresponding re-sampled characteristic curves 612 and 614.

In step 622, IM manager 320 computes general point curvature for the re-sampled curves in their lengthwise direction. In step 628, IM manager 320 computes curvature values "k" for each point on separate curves, Then, in step 636, IM manager 320 computes the cumulated curvature distance between the two curves. In the FIG. 5 embodiment, the cumulated curvature distance F(s, t) may be expressed by the following formula:

$$F(s,t)=|\kappa_1(s)-\kappa_2(t)|$$

where $k_1(s)$ represents the curvature of the source curve 612 and $k_2(t)$ represents the curvature of the target curve 614.

The IM manager 320 may then perform a PDE optimization procedure that may be expressed with the following formula:

$$T = \min_{s,t} \int F(s(\tau), t(\tau))d\tau$$

In step 640 of the FIG. 6 embodiment, IM manager 320 may utilize standard or enhanced level set methodologies to perform a PDE solver operation that may be expressed by the following formula:

$$|\Delta T|=F(s,t), T(0,0)=0$$

In step 644, IM manager 644 determines curve correspondence for source curve 612 and target curve 614. Then, in step 648, IM manager 320 computes the total curvature distance between source curve 612 and target curve 614. In step 652, IM manager 320 compares the total curvature distance between source curve 612 and target curve 614 to a predefined matching threshold value do to thereby determine whether source curve 612 and target curve 614 are matched or unmatched. The FIG. 6 process may then terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for performing an image identification procedure, comprising:
   an image manager that derives source characteristics for a source image and target characteristics for at least one target image, said image manager comparing said source characteristics and said target characteristics to determine whether said source image and said target image are matched, said source characteristics and said target characteristics each including color-space characteristics generated in a color analysis procedure and curve-space characteristics generated in a curve analysis procedure, said color analysis procedure and said curve analysis procedure each being performed in a discrete and separate manner by said image manager; and
   a processor of an electronic device that controls said image manager to perform said image identification procedure.

2. The system of claim 1 wherein said image manager compares said source characteristics to a database of said target characteristics to identify one or more matching target images.

3. The system of claim 2 wherein said source image has been subjected to an image modification procedure to produce said one or more matching images, said image modification procedure including a scaling operation, a color modification, a cropping operation, a rotation operation, and a translation operation.

4. The system of claim 1 wherein said image manager performs a down-sampling procedure on said source image during said image identification procedure.

5. The system of claim 1 wherein said image manager performs a spectral filtering procedure on said source image during said image identification procedure.

6. The system of claim 2 wherein said image manager performs a segmentation procedure on said source image during said image identification procedure.

7. The system of claim 6 wherein said segmentation procedure divides said source image into dominant regions that are defined by segmentation criteria that include a region size and a region color.

8. The system of claim 7 wherein said dominant regions define at least one characteristic curve as a boundary between said dominant regions.

9. The system of claim 8 wherein said image manager calculates a color difference value for said source image, said color difference value being based upon color characteristics from said dominant regions on either side of said characteristic curve.

10. The system of claim 9 wherein said color characteristics are derived from pixels located in two pixel bands that are immediately adjacent to said characteristic curve.

11. The system of claim 9 wherein said color-space matching procedure is performed by utilizing CIED 2000 calculation techniques.

12. The system of claim 9 wherein said image manager performs a color-space matching procedure by comparing respective color difference values for said source image and said target image.

13. The system of claim 12 wherein said image manager performs a curve-space matching procedure by calculating a curvature distance value between characteristic curves of said source image and said target image.

14. The system of claim 13 wherein said image manager performs a curve re-sampling procedure during said curve-space matching procedure.

15. The system of claim 13 wherein said image manager computes a cumulated curvature distance as a cost function during said curve-space matching procedure.

16. The system of claim 13 wherein said image manager utilizes level set techniques to solve a cost-minimization equation for deriving a minimum cost as a measure of curve differences during said curve-space matching procedure.

17. The system of claim 16 wherein said image manager compares said minimum cost to a pre-defined threshold value to determine whether said characteristic curves match.

18. The system of claim 1 wherein said image identification procedure is utilized to determine whether said target image is an illegal usage of copyrighted image material.

19. The system of claim 1 wherein said image identification procedure is utilized to determine whether said target image is a modified form of said source image.

20. A method for performing an image identification procedure, comprising the steps of:

utilizing an image manager to derive source characteristics for a source image and target characteristics for at least one target image, said image manager comparing said source characteristics and said target characteristics to determine whether said source image and said target image are matched, said source characteristics and said target characteristics each including color-space characteristics generated in a color analysis procedure and curve-space characteristics generated in a curve analysis procedure, said color analysis procedure and said curve analysis procedure each being performed in a discrete and separate manner by said image manager; and controlling said image manager with a processor of an electronic device to perform said image identification procedure.

* * * * *